April 20, 1954 S. G. TILDEN 2,675,699
BRAKE SHOE BOND TESTER
Filed Nov. 17, 1950 2 Sheets-Sheet 1

INVENTOR.
Sydney G. Tilden
BY C. P. Goepel
his ATTORNEY

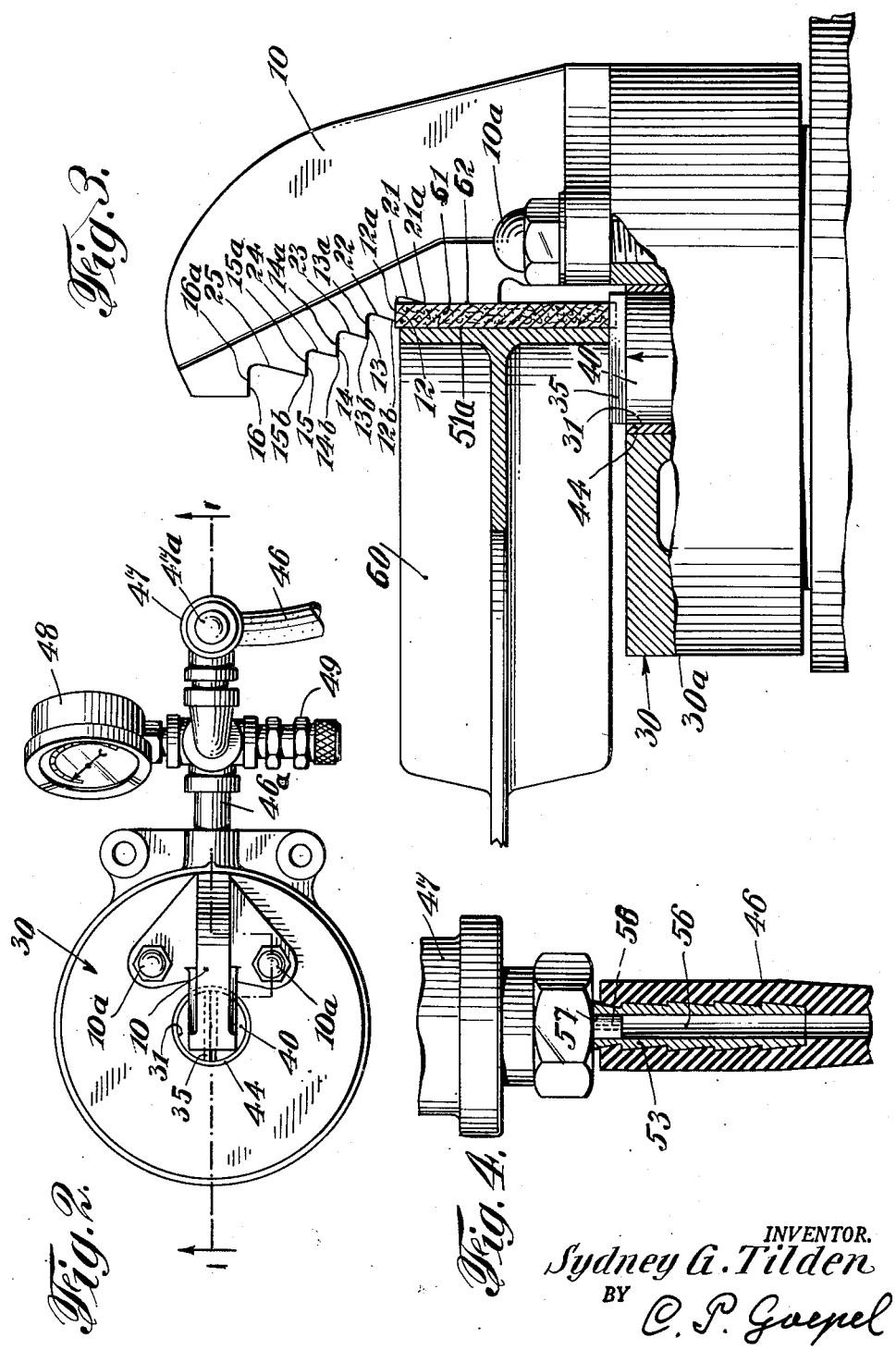

Patented Apr. 20, 1954

2,675,699

UNITED STATES PATENT OFFICE 2,675,699

BRAKE SHOE BOND TESTER

Sydney G. Tilden, Stewart Manor, N. Y., assignor to The Permafuse Corp., Garden City, N. Y., a corporation of New York Application November 17, 1950, Serial No. 196,105

2 Claims. (Cl. 73—101)

This invention relates to brake shoe bond testers.

In the production of bonded brake shoes, i. e. brake shoes which have a friction material facing bonded to the brake shoe by means of an adhesive, it becomes important, after such friction material has been bonded to the brake shoe, to provide some means of testing quickly the strength of the bond to determine if it meets a safe requirement. When bonded automotive brake shoes are used, failure of the bond in service may cause failure of the entire braking system of the vehicle and place in jeopardy of lives of the occupants as well as others on streets and highways.

Automotive brake shoes vary in size and configuration, and a tester to be practical for use in the replacement or service field, must be able to test the various shoes without regard to the configuration of the brake shoe or the arcuate length, thickness, or width of the friction material facing, all within the limits of actual trade practice.

Various testing devices have been built but all have had limitations as to size and/or configuration of the brake shoe which could be tested and had to resort to the use of complicated fittings or adaptors, costly to make and time consuming to use.

Conscious of the shortcomings of the previous art, the present invention comprises a bonded brake shoe tester which is simple, fast, universal in its adaptation to all standard brake shoes within the size limits of the device, and comparatively inexpensive to manufacture and produce.

The invention consists of a testing device to determine the strength of the bond between a brake shoe and its friction material facing and whether or not it exceeds a certain minimum. The testing device has a base member with a horizontally disposed top surface to support a bonded brake shoe placed edgewise upon it, force means applied to the lower edge of the brake shoe to force the brake shoe vertically upward, a stationary barrier above the friction material facing and restraining the edge thereof from any upward movement, thus placing the bond between the brake shoe and friction material facing in direct shear, and means to control and measure the intensity of the force means.

To make such a tester universal in its adaptation to brake shoes of various standard sizes and of different manufacture, the aforesaid barrier is provided with a series of inverted steps with horizontal stepped portions, the height of each stepped portion above the horizontal brake shoe supporting base member corresponding to a width of various brake shoes, and a corresponding series of riser portions, the latter serving as a stop to position the friction material facing under one of the steps. To accommodate a brake shoe on which the friction material facing may extend laterally beyond the edge of the brake shoe, the aforesaid means for applying a force to the edge of the brake shoe includes a knife edge running crosswise to the brake shoe and serving to cut into any extending portion of the friction material facing until the knife edge encounters the metallic brake shoe itself.

With the foregoing are combined operative means to actuate the aforesaid means for moving the brake shoe, including valves and a gauge for measurement purposes.

The invention will be further described, an embodiment shown in the drawings, and the invention will be finally pointed out in the claims.

In the accompanying drawings,

Fig. 2 is a plan view of the improved tester;

Fig. 3 is a detail side view, partly in section, showing a brake shoe with friction material bonded thereto, the piston being shown diagrammatically; and Fig. 4 is a longitudinal section showing a choke in the air supply pipe.

Similar characters of reference indicate corresponding parts throughout the various views.

Figure 1:
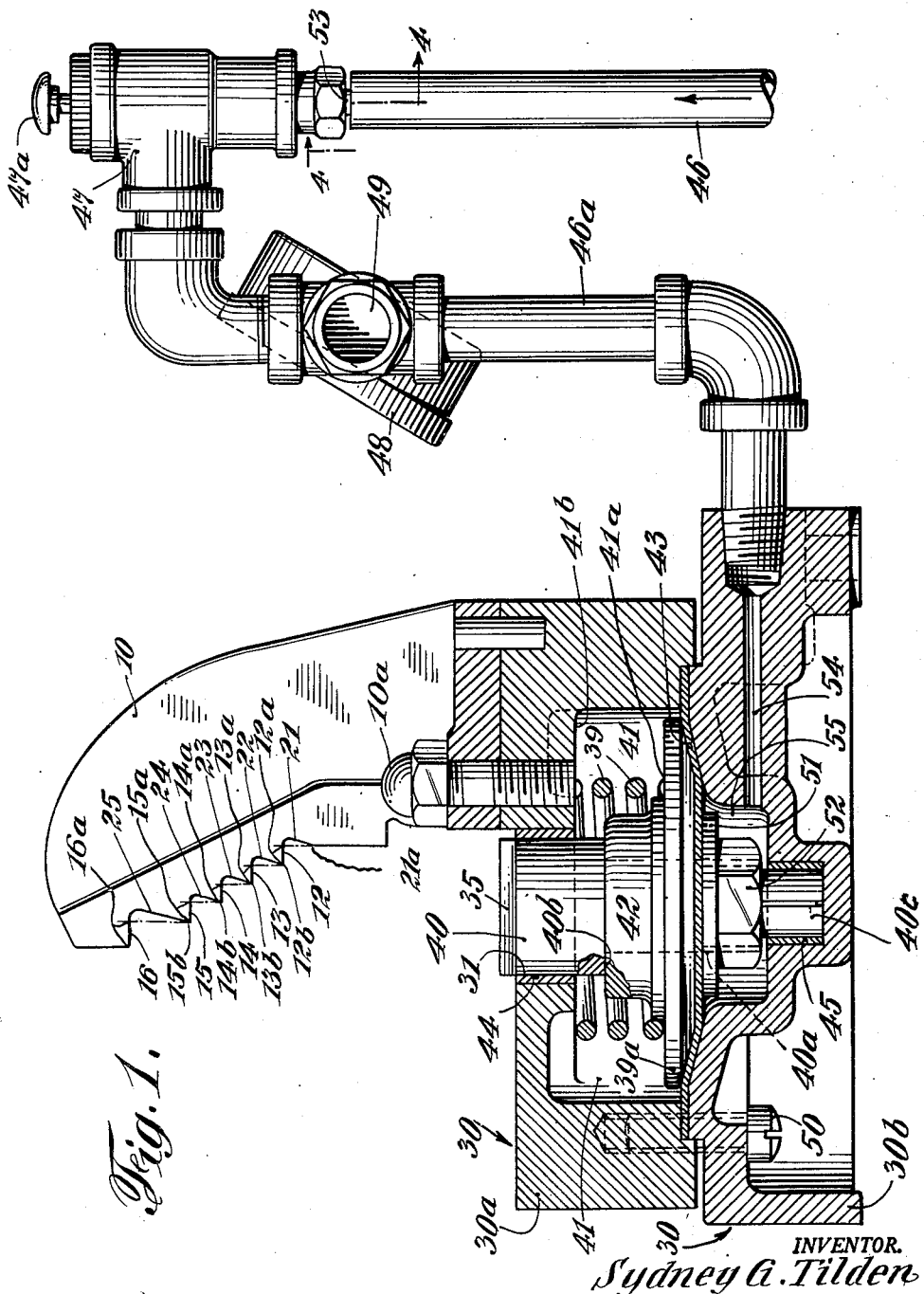
Fig. 1 is a vertical section taken on line 1—1 of Fig. 2.

Referring to the drawings, a base member 30 has an opening 31 in which a knife edge 35 is disposed. A piston 40, guided by bushings 44 and 45 to insure its true axial movement up and down, supports the knife edge 35 and has an inverted cup flange 42 within a chamber 41 of the base member 30.

The piston 40 has a reduced-diameter portion 40a forming a shoulder 40b, against which the flange 42 rests. The flange 42 extends or flares outwardly. One end of a coiled spring 39 abuts at 41a against the plate 39a, the other end of the spring abutting against a wall 41b in the base member 30. The flange 42 rests on a plate 39a, which plate in turn rests on a diaphragm or membrane 43, held at its peripheral margin by a clamp formed by the upper part 30a of the base member 30, and the lower part 30b of the base member 30, these parts being held tightly together by bolts 50. The reduced-diameter portion 40a of the piston 40 passes through the membrane 43 and below the membrane is surrounded by a plate 51, which is held against the lower surface of the membrane 43 by a nut 52, engaging screwthreads on the portion 40a. This portion 40a also has a reduced-diameter portion 40c which is guided in the bushing 45. The lower member 30b of the base member 30, has a conduit 54 leading from the interior space or chamber 55 to a pipe 46a for the supply of air to the space 55. When compressed air enters the space 55, the membrane 43 is moved upwardly, and moves the piston 40 and its knife 35 in the same direction, against the tension of the spring 39, and when air pressure is released, the spring 39 moves the piston 40, downwardly to normal position, corresponding to the normal position of the membrane as shown in the drawings. Air pressure is applied to the space 55 and the membrane 43, by pressing on the cap 47a of the valve 47.

Compressed air is admitted through a hose 46 and is controlled by a three-way operating valve 47. A pressure gauge 48 and pressure relief valve 49 are provided in the piping 46a between the three-way operating valve 47 and the chamber 55 of the base member 30.

A bracket 10 is mounted on the base member 30 by bolts 10a and is provided with a barrier consisting in the embodiment shown of a series of saw-toothlike inverted steps 12, 13, 14, 15 and 16, each step adapted to receive a brake shoe 60 of a standard width. A brake shoe having a friction material facing 61 bonded to its external arcuate surface by a bond 51a, is placed edgewise upon the base member 30 with the lower edge of the brake shoe resting across the knife edge 35 and the upper edge of its friction material facing 61 lying under one of the steps 12 through 16 incl.

For instance, the step 12 is slightly more than 1¾" above the knife edge and is for shoes 1¾" wide; step 13 is slightly more than 2" above the knife edge and is for shoes 2" wide; step 14 likewise is for shoes 2¼" wide; step 15 for shoes 2½" wide, and step 16 is for shoes 3" wide.

Each step extends successively upwardly and outwardly beyond its immediate lower step, the lower step acting as a stop to position the brake shoe under the upper step. The steps are connected by risers 21, 22, 23, 24 and 25. The knife edge 35 is located directly below and aligned with the group of steps 12 to 16 and has a length somewhat greater than the sum total of the horizontal portions of the steps so that the knife edge will always contact any brake shoe which can be accommodated under the steps 12 through 16.

Figure 3 depicts a brake shoe 60 which is 1¾" wide in place upon the knife edge 35 with the bonded friction material facing 61 underneath the step 12 and against the stop 21a. The riser portions 21 to 25 are inwardly and upwardly inclined. Each step has an operating length less than the thickness of the friction material facing 61 so that the step will contact only the friction material itself and will not contact the brake shoe 60. The operative length and each step is gauged by the outward edge projection of the next lower step, which acts as a stop or gage to determine the amount of the thickness of said facing to be engaged by the step above.

As automotive brakes have been so standardized that practically all brakes up to 2½" wide are designed to have friction material facings not less than ³⁄₁₆" thick and brakes 3" wide are designed to have facings not less than ¼" thick, the proposed form of step structure meets all these requirements.

The operative lengths of the steps 12 through 15 are therefore made not more than ³⁄₁₆" each, preferably less—say ⁵⁄₃₂", and the operative length of step 16 is made not more than ¼", preferably less—say ⁷⁄₃₂". The operative lengths are indicated by 12a, 13a, 14a, 15a and 16a; the stop points of the steps below are indicated by 12b, 13b, 14b, and 15b, the part 21a of the barrier acting in the same manner.

When compressed air is admitted to the chamber 55 by operation of the three-way operating valve 47, an upward force will be exerted on the piston 40. This upward force is transmitted to the brake shoe 60 through the knife edge 35 and the brake shoe is restrained from moving upward by the step 12 in contact with its bonded friction material facing 61. (Fig. 3.) Thus there is a shear force exerted on the bond holding the friction material 61 to the shoe 60 and if this shear force is of sufficient intensity, it will fracture the bond or shear the friction material.

The intensity of the force exerted on the piston 40, is in direct proportion to the pressure of the air within the chamber 55. In the preferred design, this pressure is controlled by the action of the pressure relief valve 49 which may be set to open at any pressure from zero up to full line pressure (usually 150 p. s. i.). Pressure within the chamber 55 may be otherwise controlled by means of various pressure regulators known to the art or by manual control, but I prefer the pressure relief valve as an inexpensive, yet very simple method of obtaining pressure control.

In order not to waste air during the test by excessive discharge through the pressure relief valve, I prefer to introduce a choke in the admission port. (Fig. 4.) The air hose 46 is connected to the three-way operating valve 47 through the air stem 53. A choke is introduced in the air stem and consists of a lead slug 57 expanded in place within the air stem port 56 having a small hole 58 for the passage of the air. The choke limits the flow of air to the chamber 55 so that a relatively slow, smooth action of the piston 40 is obtained and excessive discharge of air through the relief valve 49 is prevented. I have found that a hole of approximately .040" dia. in the slug 58 gives very satisfactory operational characteristics. Upon release of the three-way operating valve 47, air is exhausted from the chamber 55 and the piston 40 is returned to its fully retracted position by the spring 39 (Fig. 1).

A knife edge is used to contact the brake shoe because it is possible, due to misalignment of the friction material facing during the bonding operation or perhaps the use of a friction material which is slightly wider than the brake shoe, that the friction material might extend somewhat over the edge of the brake shoe. In such a case, that is, without a knife edge, the piston 40 would contact the extending edge of the friction material, instead of the brake shoe, and its force would produce no shear stress on the bond at all, but merely a compression of the friction material itself. For this reason, the knife edge 35 is imposed on the top of the piston 40 and crosswise to the brake shoe 60 so that, in the event the friction material extends beyond the edge of the brake shoe 60 as shown in Figure 3, the knife edge will cut into the friction material until it contacts the brake shoe. Since all friction materials employed as brake shoe facings are soft and frangible compared to the metal of the brake shoe, the force employed on the piston 40 in testing is ample to cause the knife edge to cut into the friction material until the knife edge contacts the brake shoe. After that, the load imposed by the piston 40 with its knife edge 35, is taken by the brake shoe and not by the friction material, thus placing the bond itself in direct shear.

The operation of my improved testing device is as follows:

A brake shoe 60, Figure 3, of any of the above selected widths having a friction material facing 61 bonded to its exterior arcuate surface is placed edgewise across the knife edge 35 with the edge portion of the friction material 61 under one of the inverted steps 12 through 16 and the exterior arcuate surface edge of the friction material 62 in contact with one of the steps 31 through 25 or in contact with the stop 21a. The three-way valve 47 is then operated admitting compressed air into the chamber 55 which exerts a pressure on the diaphragm 43 and a corresponding force on the piston 40, the knife edge 35 and the brake shoe 60 resting thereon. The forces of reaction are taken through the friction material facing 61, one of the steps 12 through 16, and the bracket 10 attached to the base 30. By adjustment of the pressure relief valve 49, the pressure within the chamber 55 is limited to a predetermined amount and is indicated by the pressure gauge 48. The bond between the brake shoe 60 and its friction material facing 61 is thus placed in direct shear of an intensity established by the action of the pressure relief valve 49.

Since the improved tester is designed primarily for production testing, as distinct from a laboratory test to destruction, the pressure relief valve 49 is adjusted to exhaust at a pressure which will not fracture or otherwise harm a bond of normal or satisfactory shear strength, but will fracture a bond of sub-normal or unsatisfactory shear strength. In other words, the tester is designed to submit the bond to a pre-selected shear force to determine if the bond strength exceeds a safe minimum requirement. If no separation between the bonded elements occurs, the brake shoe is considered as having passed inspection and is approved for use.

After making numerous tests with my improved device, I have determined that a force of 600 to 700 lbs. on the knife edge 35 of the piston 40 will cause no injury to a satisfactory bond having an otherwise tested shear strength in excess of 600 p. s. i., but will cause fracture of bonds of substantially lower strengths, having otherwise tested bond strengths in order of 400 to 500 p. s. i.

I wish it to be understood that I do not desire to be limited to the exact details of construction shown and described, for obvious modifications will occur to a person skilled in the art.

I claim:

1. In an apparatus for testing the bond between a brake shoe and the facing of friction material bonded thereto, the combination of a base having a plane top surface for supporting said brake shoe, said base having a chamber formed therein, the top of said base forming one wall of said chamber and having an opening extending therethrough communicating with said chamber, a flexible diaphragm mounted in said base and forming another wall of said chamber, a piston mounted at one end on one side of said diaphragm for axial movement in said chamber through said opening and connected with said diaphragm, the other end of said piston terminating in a knife edge in a plane substantially even with the plane of said supporting surface adapted to engage one edge of said brake shoe and friction material and to cut into any portion of said material protruding laterally beyond that edge of the brake shoe, conduit means leading to the other side of said diaphragm adapted to be connected to a source of air under pressure, a relief valve in said conduit means, and a stationary barrier attached to said base and spaced from said supporting surface facing said piston and adapted to engage the other edge of said friction material to restrain movement thereof away from said base when said piston is moved toward said barrier by the application of air pressure to said diaphragm.

2. The structure of claim 1, wherein said barrier has a series of inverted steps connected by risers, each step disposed from the said supporting surface a distance corresponding to the width of a selected friction material facing, the distance from the edge of each step to each respective riser controlling the depth of contact between said friction material facing and said step when the brake shoe is placed on the said supporting surface and under the said barrier.

References Cited in the file of this patent

UNITED STATES PATENTS

| Number | Name | Date |
|---|---|---|
| 2,261,783 | Stull | Nov. 4, 1941 |
| 2,353,056 | Martindell | July 4, 1944 |
| 2,441,743 | Albert | May 18, 1948 |
| 2,498,265 | Green | Feb. 21, 1950 |